US008594449B2

(12) United States Patent
Vendrig et al.

(10) Patent No.: US 8,594,449 B2
(45) Date of Patent: Nov. 26, 2013

(54) MPEG NOISE REDUCTION

(75) Inventors: Jeroen Vendrig, Liberty Grove (AU);
Srinivasa Veena Murthy Dodballapur, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 11/961,199

(22) Filed: Dec. 20, 2007

(65) Prior Publication Data
US 2008/0152017 A1    Jun. 26, 2008

(30) Foreign Application Priority Data
Dec. 21, 2006 (AU) .................................. 2006252195

(51) Int. Cl.
*H04N 5/21* (2006.01)
(52) U.S. Cl.
USPC ........................ 382/261; 382/268; 375/240.29
(58) Field of Classification Search
USPC ........................ 375/240.29; 382/261, 268, 275
See application file for complete search history.

(56) References Cited

U.S. PATENT DOCUMENTS

| 6,366,696 | B1 * | 4/2002 | Hertz et al. | 382/183 |
| 6,668,097 | B1 | 12/2003 | Hu et al. | 382/275 |
| 6,920,252 | B2 | 7/2005 | Rouvellou | 382/275 |
| 7,003,173 | B2 | 2/2006 | Deshpande | 382/261 |
| 2003/0081854 | A1 * | 5/2003 | Deshpande | 382/261 |
| 2006/0245506 | A1 | 11/2006 | Lin et al. | 375/240.29 |
| 2007/0064816 | A1 * | 3/2007 | Chiang et al. | 375/240.29 |

OTHER PUBLICATIONS

Australian Examiner's First Report, dated Nov. 7, 2008, regarding Application No. 2006252195.
Australian Examiner's Report No. 2, dated Nov. 11, 2009, regarding Application No. 2006252195.

* cited by examiner

*Primary Examiner* — Yemane Mesfin
*Assistant Examiner* — Wanda Z Russell
(74) *Attorney, Agent, or Firm* — Fitzpatrick, Cella, Harper & Scinto

(57) ABSTRACT

A method of processing an image based upon edge energy is disclosed. The method comprises providing (100) an edge map (540) for a group of pixels, classifying (100, 110, 120) pixels in the group as either smooth region pixels or edge region pixels, identifying (120), in the group of pixels, a pixel in the proximity of an edge region pixel, and defining (160) the identified pixel as a ringing noise pixel if the identified pixel is a smooth region pixel.

14 Claims, 7 Drawing Sheets

Fig. 2

$$\begin{bmatrix} -1 & 0 & +1 \\ -2 & 0 & +2 \\ -1 & 0 & +1 \end{bmatrix}$$

Sobel Horizontal

Fig. 3

$$\begin{bmatrix} +1 & +2 & +1 \\ 0 & 0 & 0 \\ -1 & -2 & -1 \end{bmatrix}$$

Sobel Vertical

Fig. 4

| 1 | 0 | 1 | 0 | 1 |
| 0 | 0 | 0 | 0 | 0 |
| 1 | 0 | 0 | 0 | 1 |
| 0 | 0 | 0 | 0 | 0 |
| 1 | 0 | 1 | 0 | 1 |

Near Edge Filter

Cross Sigma Filter

MPEG NOISE REDUCTION

CROSS-REFERENCE TO RELATED PATENT APPLICATIONS

This application claims the right of priority under 35 U.S.C. §119 based on Australian Patent Application No 2006252195, filed 21 Dec. 2006 which is incorporated by reference herein in its entirety as if fully set forth herein.

FIELD OF THE INVENTION

The current invention relates generally to MPEG Noise reduction and in particular to reduction of block and mosquito noise.

BACKGROUND

Discrete Cosine Transform (DCT) coding, as used for image compression, is a lossy compression technique. The DCT compression technique involves generating DCT coefficients for each image block, quantizing the DCT coefficients, and then encoding the quantized coefficients using variable length encoding.

Artifacts are introduced into the recovered image when using DCT coding. Block artifacts are introduced because the image is decomposed into blocks in order to perform the DCT processing. Ringing artifacts are caused as a result of the Gibbs phenomenon, which results from truncation of high frequency coefficients. Post filtering of the decoded video stream is thus an essential step to remove these artifacts. Block artifacts are present in smooth areas and ringing artifacts are most visible around strong edges.

The most important aspect of post processing is to reduce blocking and ringing artifacts without causing image degradation. Current approaches use complex detection processes for detecting block boundaries. Many techniques also use complex processes in order to avoid edges when processing to remove ringing artifacts. In addition they use temporal filtering, motion vectors and motion compensation. Furthermore, many current methods depend on a priori knowledge about the DCT block processing used for encoding. As a result, conventional systems are inflexible and computationally expensive.

SUMMARY

It is an object of the present invention to substantially overcome, or at least ameliorate, one or more disadvantages of existing arrangements, thereby substantially removing or reducing block and ringing artifacts, using a technique that is efficient, simple and tuneable. The term tunable in this context means that parameters used in the disclosed technique can be adjusted depending on the desired quality, or depending upon additional information about the input video.

Disclosed are arrangements, referred to as Edge Energy Based Noise Filtering arrangements (or simply EENF arrangements), which seek to address the above problems by classifying image pixels according to their edge energy and the edge energy of surrounding pixels, and applying a noise reduction filter accordingly.

According to a first aspect of the present invention, there is provided a method of processing an image comprising a plurality of pixels, the method comprising the steps of:
    providing an edge map for a group of pixels;
    classifying pixels in the group as one of at least smooth region pixels and edge region pixels;
    identifying, in the group of pixels, a pixel in the proximity of an edge region pixel; and
    defining the identified pixel as a ringing noise pixel if the identified pixel is a smooth region pixel.

According to another aspect of the present invention, there is provided an apparatus for processing an image comprising a plurality of pixels, the apparatus comprising:
    a memory for storing a program; and
    a processor for executing the program, said program comprising:
    code for providing an edge map for a group of pixels;
    code for classifying pixels in the group as at least one of smooth region pixels and edge region pixels;
    code for identifying, in the group of pixels, a pixel in the proximity of an edge region pixel; and
    code for defining the identified pixel as a ringing noise pixel if the identified pixel is a smooth region pixel.

According to another aspect of the present invention, there is provided a Television apparatus for processing an image comprising a plurality of pixels, the apparatus comprising:
    a memory for storing a program; and
    a processor for executing the program, said program comprising:
    code for providing an edge map for a group of pixels;
    code for classifying pixels in the group as at least one of smooth region pixels and edge region pixels;
    code for identifying, in the group of pixels, a pixel in the proximity of an edge region pixel; and
    code for defining the identified pixel as a ringing noise pixel if the identified pixel is a smooth region pixel.

According to another aspect of the present invention, there is provided a video apparatus for processing an image comprising a plurality of pixels, the apparatus comprising:
    a memory for storing a program; and
    a processor for executing the program, said program comprising:
    code for providing an edge map for a group of pixels;
    code for classifying pixels in the group as at least one of smooth region pixels and edge region pixels;
    code for identifying, in the group of pixels, a pixel in the proximity of an edge region pixel; and
    code for defining the identified pixel as a ringing noise pixel if the identified pixel is a smooth region pixel.

According to another aspect of the present invention, there is provided a computer program product including a computer readable medium having recorded thereon a computer program for directing a processor to execute a method for processing an image comprising a plurality of pixels, said program comprising:
    code for providing an edge map for a group of pixels;
    code for classifying pixels in the group as at least one of smooth region pixels and edge region pixels;
    code for identifying, in the group of pixels, a pixel in the proximity of an edge region pixel; and
    code for defining the identified pixel as a ringing noise pixel if the identified pixel is a smooth region pixel.

Other aspects of the invention are also disclosed.

BRIEF DESCRIPTION OF THE DRAWINGS

One or more embodiments of the present invention will now be described with reference to the drawings, in which:
FIG. 2 Sobel Horizontal filter;
FIG. 3 Sobel Vertical filter;
FIG. 4 Near Edge Filter;

DETAILED DESCRIPTION INCLUDING BEST MODE

Figure 1:
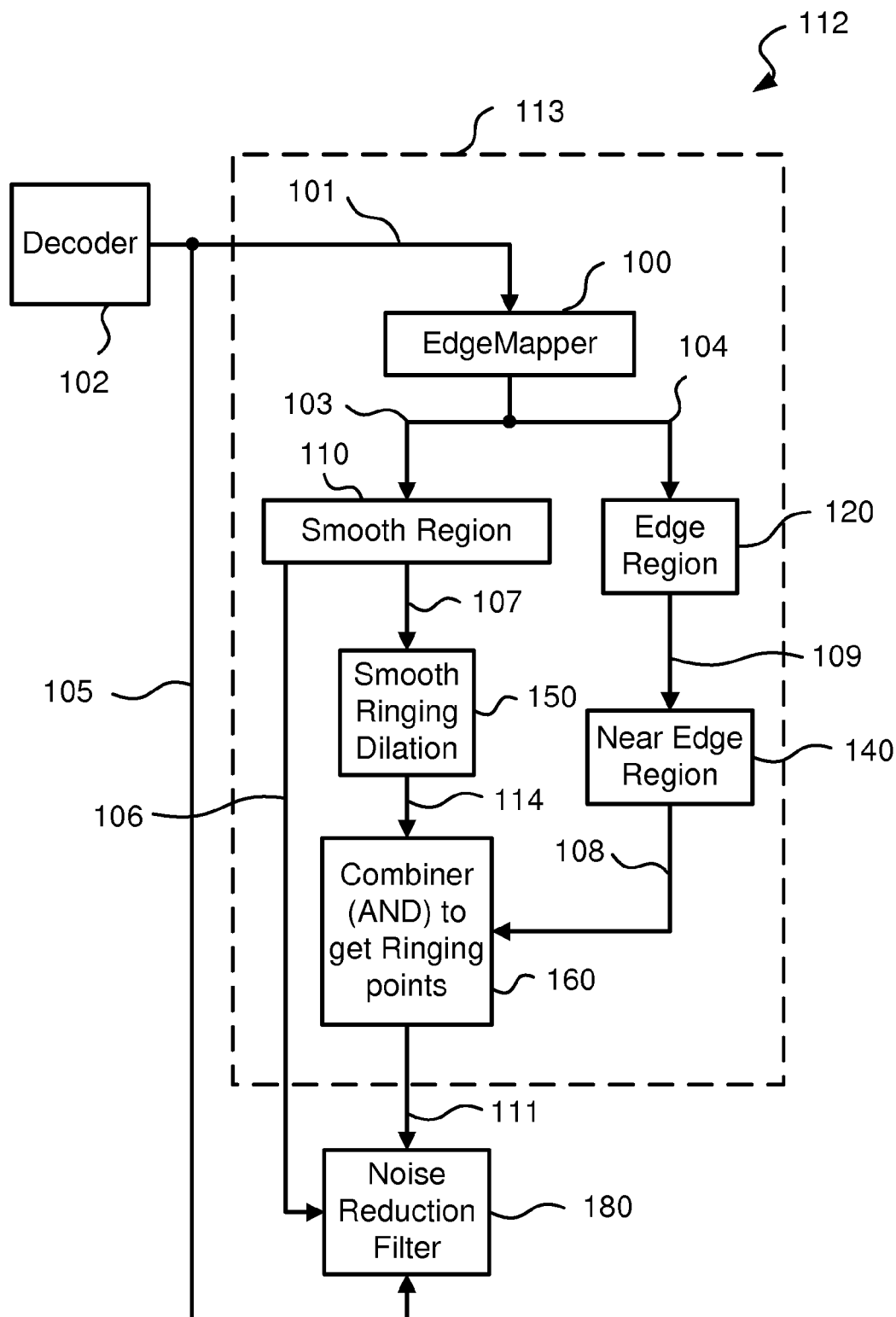
FIG. 1 is a functional block diagram of an EENF arrangement.

Where reference is made in any one or more of the accompanying drawings to steps and/or features, which have the same reference numerals, those steps and/or features have for the purposes of this description the same function(s) or operation(s), unless the contrary intention appears.

As noted, the described EENF arrangements above mentioned embodiments reduce or eliminate block noise and mosquito noise from a decoded video stream, where this noise has been introduced by the Discrete Cosine Transform (DCT) during encoding of the video stream, using MPEG-2 for example. The EENF arrangements are independent of the specifics of the encoder and/or decoder. Mosquito noise is a time dependent video compression impairment in which the high frequency spatial detail in video images having crisp edges is aliased intermittently.

FIG. 1 is a functional block diagram of an EENF arrangement 112. A noise detection process 113 identifies pixels in a video stream 101 having block and ringing noise and classifies the pixels accordingly. In one arrangement, the pixel is represented by a luminance value, for example the Y component in the YUV colour space. The aforementioned classification is used on a per-pixel basis to control a noise reduction filter 180. The noise reduction filter 180 is applied to luminance pixels in the video stream 101 only at pixel locations classified as having certain types of noise determined by the noise detection process 113. Other pixels are left unprocessed. Since applying a noise reduction filter to edge pixels may result in image degradation because the edges of the image get blurred, an edge preserving filter is incorporated into the noise reduction filter in one arrangement. In this arrangement. the edge preserving filter is applied to all luminance pixels to be processed by the noise reduction filter 180, regardless (ie irrespective) of whether there is an edge that needs to be preserved or not.

A decoder 102 communicates with an edge mapper process 100 (also referred to as an edge mapper module, the terms process and module being used interchangeably unless indicated otherwise by the context) and the noise reduction filter 180, as depicted by respective arrows 101 and 105. The decoder 102 outputs the decoded video stream 101 whose constituent pixels are input into the EENF system 112. In particular, the pixel stream 101 is input to the edge mapper process 100 and the noise reduction filter 180. The pixel stream 101 can, for example, be made up of decoded pixels from standard definition TV which displays images having a width of 720 pixels and a height of 480 pixels.

The Edge Mapper process 100 assigns an edge classification to each pixel in the input picture thereby producing an edge map. In one arrangement the Edge Mapper process 100 performs Sobel edge detection and thresholding in an "n by n" window, where n has a value greater than or equal to 3. The parameter n is specified as having the value "3" in the described examples. Other edge detection filters such as Canny or Prewitt filters may be used instead of the Sobel edge detection filter. The horizontal and vertical edges of the image input at 101 are detected using Sobel Horizontal and Sobel Vertical filters, examples of which are depicted in FIG. 2 and FIG. 3. The values output by the Sobel horizontal and vertical filters are combined to obtain the gradient g, e.g. by adding the squares of the values and then taking the square root according to the following mathematical relationship:

$$\text{Gradient } g = \text{sqrt}(\text{sobel}H * \text{sobel}H + \text{sobel}V * \text{sobel}V)$$

In an alternative arrangement, for computational speed, the above-noted mathematical relationship is modified as follows:

$$g = \text{sobel}H * \text{sobel}H + \text{sobel}V * \text{sobel}V \quad [1]$$

where:

Gradient g represents the edge energy expressed in edge energy units;

sobelH is a horizontal Sobel filter used to detect horizontal edges; and sobelV is a vertical Sobel filter used to detect vertical edges.

An edge map is derived from the gradient by thresholding. In one EENF arrangement, the edge classification is based on the following thresholds:

$$P(i,j) = \{\begin{array}{l} \text{LowEdgePixel-A, if } g < \text{RingThreshold}, \\ \text{LowEdgePixel-B, if } g < \text{BlockThreshold}, \\ \text{HighEdgePixel, if } g > \text{EdgeThreshold} \end{array}\} \quad [2]$$

where:

P(i,j) represents the edge classifications for a pixel; and

LowEdgePixel-A, LowEdgePixel-B and HighEdgePixel are classifications that can be assigned to a pixel depending upon the outcome of [2].

In the noted arrangement, a pixel may have 0, 1, 2 or 3 classifications meaning that it can be classified as a LowEdgePixel-A pixel, and/or a LowEdgePixel-B pixel, and/or an HighEdgePixel pixel, or none of the aforementioned classifications. In an alternative arrangement, if the pixel does not satisfy any of the above threshold criteria, the pixel may be given a default classification.

Pixels with low edge energy are classified as LowEdgePixel-A pixels. In the noted arrangement, RingThreshold is a predetermined value, say 700 edge energy units. These LowEdgePixel-A pixels are used for identifying ringing noise. Pixels with low and moderate edge energy are classified as LowEdgePixel-B pixels, and are used to identify block noise. In the noted arrangement, BlockThreshold is a predetermined value, say 900 edge energy units. Pixels which are of very high edge energy are classified as HighEdgePixel pixels. These pixels are used for identifying edges. In the noted arrangement, EdgeThreshold is a predetermined value, say 1800 edge energy units.

In an alternative arrangement, the thresholds are relative to one another. For example, BlockThreshold can be defined as RingThreshold+200, or EdgeThreshold can be defined as BlockThreshold*2. In yet another arrangement, the thresholds can be based on a statistic such as the average edge value for a picture or an area in the picture.

The edge mapper 100 thus outputs, at 103, pixels classified as LowEdgePixel-A pixels (see 900 in FIG. 5), and/or pixels classified as LowEdgePixel-B pixels (see 901 in FIG. 5) or not.

Returning to FIG. 1, the edge mapper 100 communicates with a smooth region module 110 and an edge region module 120, as depicted by respective arrows 103 and 104, and the pixel classifications described above are used by the smooth region process 110 and the edge region process 120.

In the noted arrangement, the smooth region process 110 classifies pixels as falling into one of at least two categories of smooth pixels, namely ringing smooth pixels and/or block smooth pixels. The classification process involves considering each pixel in the context a surrounding mask of pixels centered on the pixel in question. We refer to this context as a region. For a given pixel, by counting the number of pixels classified as LowEdgePixel-B pixels in the associated mask, and checking this number against a smoothBlockThreshold, the pixel in question (ie at the centre of the mask) is classified as being either a smoothBlockPixel pixel (see 903 in FIG. 5) or not. In an alternative arrangement, a default classification can be used in addition to the two types of smooth pixel classifications. In the noted arrangement, the smoothBlockThreshold is a predetermined value, say 23 pixels for a 5×5 window. In another arrangement, the smoothBlockThreshold is determined dynamically using the following mathematical relationship:

smoothBlockThreshold is 75% of the window size+4 in a n by n window;
where n is greater than or equal to 5.

Again using the mask approach described above, by counting the number of pixels classified as LowEdgePixel-A pixels in the mask and checking this number against a smoothRingThreshold, the pixel at the centre of the mask is classified as being either a smoothRingPixel pixel (see 904 in FIG. 5) or not. In the noted arrangement, the smoothRingThreshold is a predetermined value, say 21 pixels for a 5×5 window. In another arrangement, the smoothRingThreshold is determined dynamically using the following mathematical relationship:

smoothRingThreshold is 75% of the window size+2 in a n by n window;
where n is greater than or equal to 5.

Figure 5:
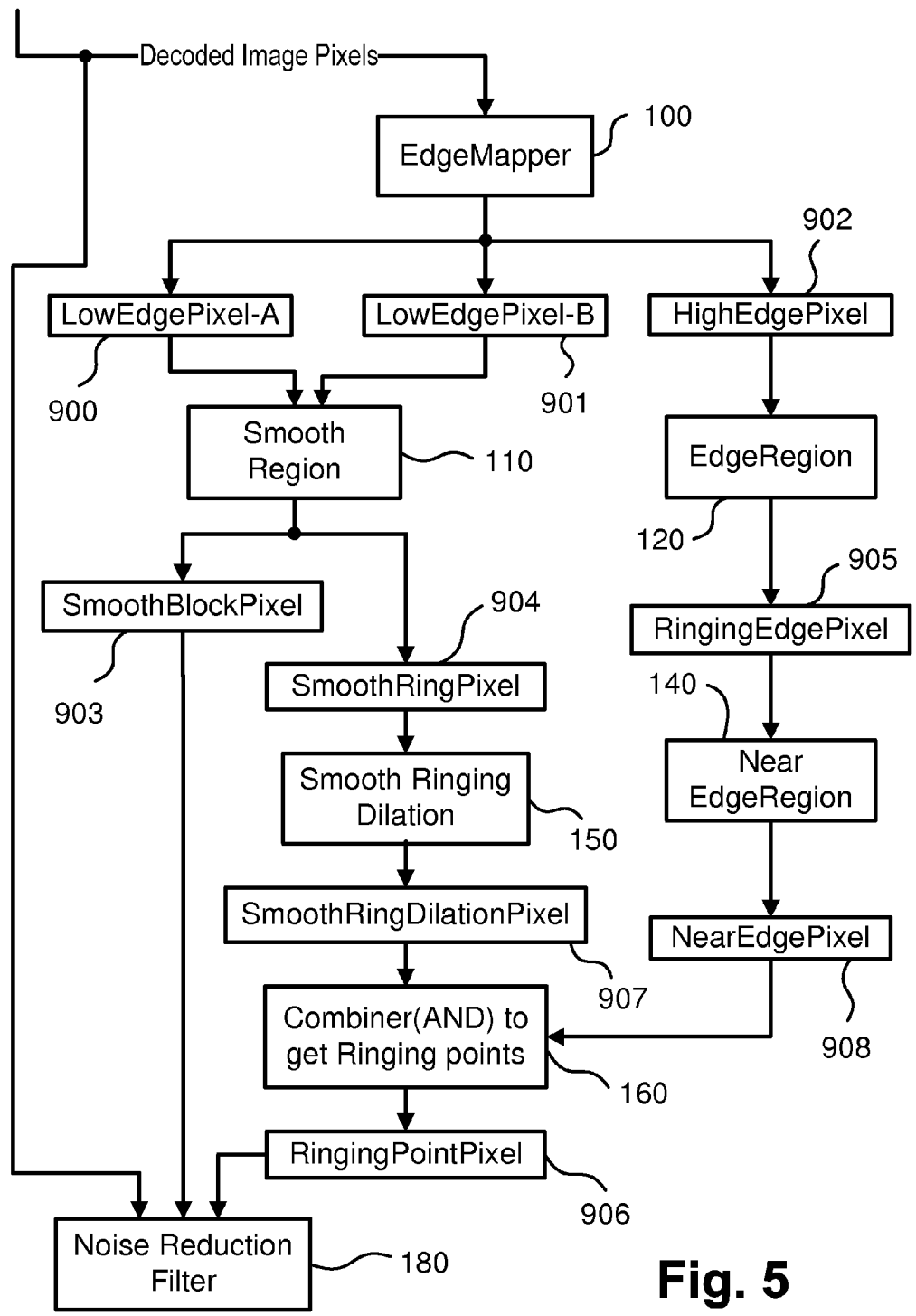
FIG. 5 shows pixel inputs and outputs in the arrangement of FIG. 1.

The outputs 106, 107 of the smooth region process 110 thus respectively output pixels classified as smoothRingPixel pixels (see 904 in FIG. 5) or pixels classified as smoothBlockPixel pixels (see 903 in FIG. 5). The pixels classified as smoothRingPixel pixels are a subset of the pixels classified as smoothBlockPixel pixels.

In an alternative arrangement, in order to reduce false positives, convolution and thresholding operations can be applied to the outputs 106, 107 from 110. Thus, for example, for every n by n region, the number of pixels classified as SmoothRingPixel pixels are counted in a 5 by 5 window, and compared with another threshold value say 20.

In one arrangement, the respective outputs 107, 106 of the smooth region process 110 are used directly by the Combining process 160 and the noise reduction filter 180.

In an alternative arrangement, further processing is done before the results are used, through an extension process or smooth ringing dilation process 150 which is inserted between the smooth region process 110 and the combining process 160. The smooth ringing dilation process 150 extends part of the results from the smooth region process 110. The smooth ringing dilation process 150 serves to include a region next to a smooth region, which may have been smooth in the original signal into the decoder 102, but which was distorted due to compression by the encoder (not shown).

In the alternative arrangement including the smooth ringing dilation process 150, the pixels from the smooth region process 110 are dilated in the smooth ringing dilation process 150. The dilation process classifies a pixel as a smoothRingDilationPixel pixel, if any pixel in an n by n window centered on the pixel is also a smoothRingPixel pixel. In the noted arrangement n has the value 5. The output 114 of the dilation process 150 is a pixel classified as a smoothRingDilationpixel pixel (see 907 in FIG. 5) or not.

In this arrangement, the output 114 of the smooth ringing dilation process 150 is input to the Combining process 160, and the output 106 of the smooth region process 110 is input to the noise reduction filter 180.

Returning to the edge region module 120, this process helps to identify the edge regions, these being regions with a high concentration of edge pixels. In the noted arrangement, the input 104 to this process 120 are the pixels classified as HighEdgePixel pixels (see 902 in FIG. 5) or not. Again using the mask approach described above, the edge region process 120 counts the number of pixels classified as HighEdgePixel pixels in the mask that are of high edge energy. If the number of such pixels is greater than edgeRingingThreshold, then the pixel at the centre of the mask is classified as a RingingEdgePixel pixel (see 905 in FIG. 5) or not. The pixel at the centre of the mask may or may not be a HighEdgePixel pixel itself.

In the noted arrangement, edgeRingingThreshold is a predetermined value, say 8 pixels. In another arrangement, edgeRingingThreshold is determined dynamically, for example 25% of the window size in a n by n window where n is greater than or equal to 3. The output 109 of the edge region process 120 is the pixel classified as a RingingEdgePixel pixel (see 905 in FIG. 5) or not. This pixel is passed via 109 to the near edge region process 140. The near edge region module 140 communicates with the combining module 160 as depicted by an arrow 108.

The near edge region process 140 identifies regions next to an edge. This is an important operation because ringing pixels are typically present in the smooth areas near an edge. In the noted arrangement, the input to the near edge region process 140 is the pixel classified as a RingingEdgePixel pixel 905 (see FIG. 5) or not, which is output from the edge region process 120. In the noted arrangement, the process 140 performs convolution using a filter such as the one specified in FIG. 4. This filter, referred to as a near edge or proximity filter, helps to identify the regions that have at least one strong edge. If there is at least one strong edge around the pixel considered in an n by n window, where n is greater than or equal to 3, say 5, the pixel is classified as a NearEdgePixel pixel (see 908 in FIG. 5).

The smooth ringing dilation module 150 or smooth region module 110 communicates with the noise reduction filter 180 and the combining process 160. The near edge process 140 communicates with the combining module 160 as depicted by an arrow 108. The Combining process 160 determines which pixels are near an edge and near a smooth region, and are thereby likely to be affected by ringing noise. In one arrangement, the pixels classified as NearEdgePixels pixels or not by the near edge region process 140, and the pixels classified as smoothRingPixel pixels or not by the smooth region process 110 are combined (ie subjected to a logical AND operation) in the combining process 160 to obtain, at 111, the pixels classified as RingingPointPixel pixels (see 906 in FIG. 5) or not.

In an alternative arrangement, the pixels classified as NearEdgePixels pixels or not by the near edge region process 140, and the pixels classified as smoothRingDilationPixels pixels or not by the smooth ringing dilation process 150 are combined (ie subjected to a logical AND operation) in the combining process 160 to obtain, at 111, the pixels classified as RingingPointPixel pixels (see 906 in FIG. 5) or not.

In one arrangement, the noise detection process 113 is successively applied to successive groups of pixels across the image being processed, until the entire image has been processed. In an alternate arrangement, the edge mapper can be applied to across the entire image, with the resultant edge maps from the successive groups of pixels being buffered for subsequent group by group processing by the other functional modules in the noise detection process 113. Other arrangements can also be used.

Figure 6:
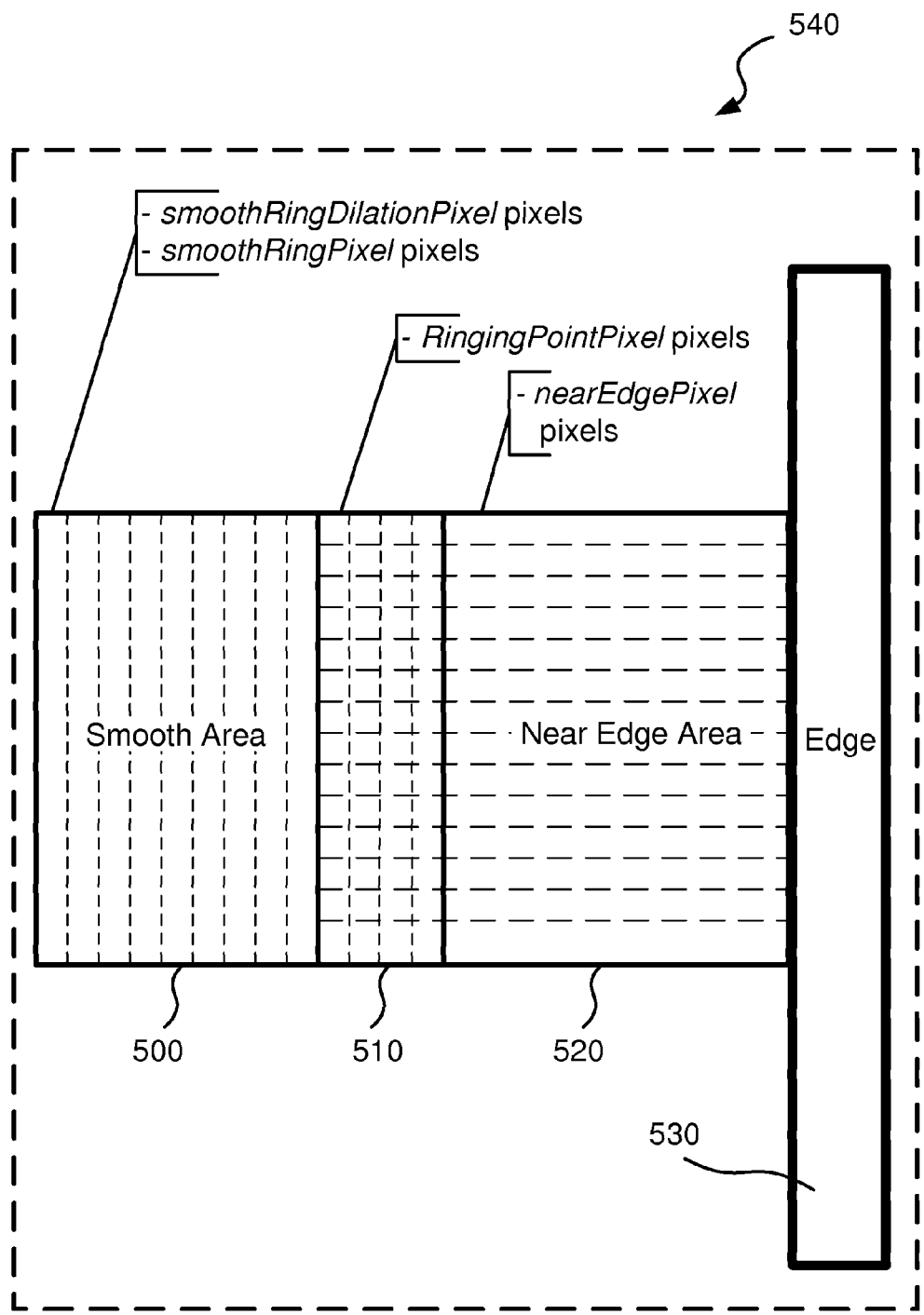
FIG. 6 depicts the ringing region.

FIG. 6 depicts a fragment of the image to be reconstructed from the pixel stream 101 (see FIG. 1). A smooth area 500 comprises pixels classified as SmoothRingDilationPixel pixels (see 907 in FIG. 5) or SmoothRingPixel pixels (see 904 in FIG. 5). A near edge area 520 comprises pixels classified as NearEdgePixel pixels (see 908 in FIG. 5). The effect of combining the pixels in the near edge area 520 which is present near, or in the vicinity or proximity of, a strong edge 530, and the pixels in the smooth area 500, which is somewhat removed from the strong edge 530, is the intersection of the two areas 520 and 500, which forms an area 510, referred to as an overlap area, comprising pixels classified as RingingPointPixel pixels (see 906 in FIG. 5). In another arrangement, an additional extension process follows the Combining Process 160 to extend the RingingPointPixels. The purpose of the extension is to include those points that are close to detected ringing points, as they have a high likelihood of being ringing points as well.

Once the noise pixels, namely those classified as SmoothBlockPixel pixels, and/or SmoothRingPixel pixels or SmoothRingDilation pixels, and/or RingingPointPixel pixels, have been identified, then the noise reduction filter 180 is applied, and the combining module 160 thus communicates with the noise reduction module as depicted by an arrow 111 (see FIG. 1). The pixels classified as SmoothBlockPixel pixels or not from the smooth region process 110 and the pixels classified as RingingPointPixel pixels or not from the combining process 160 are input to the noise reduction filter 180, as depicted by the respective arrows 106 and 111, along with the original pixels from the pixels stream 101 via 105. The noise reduction filter 180 is applied to original pixels at 105, at the pixel locations classified as SmoothBlockPixel and RingingPointPixel pixels. Other pixels are left unprocessed.

The described EENF arrangement does not exclude edge pixels from processing by the noise reduction filter 180. This approach reduces the need for accurate edge detection, which is a complex and issue in image processing. However, applying a (pure) noise reduction filter to edge pixels may result in image degradation because the edges of the image become blurred. For this reason, an edge preserving filter is incorporated in the preferred arrangement, for example a sigma filter incorporated into the noise reduction filter 180.

Figure 7:
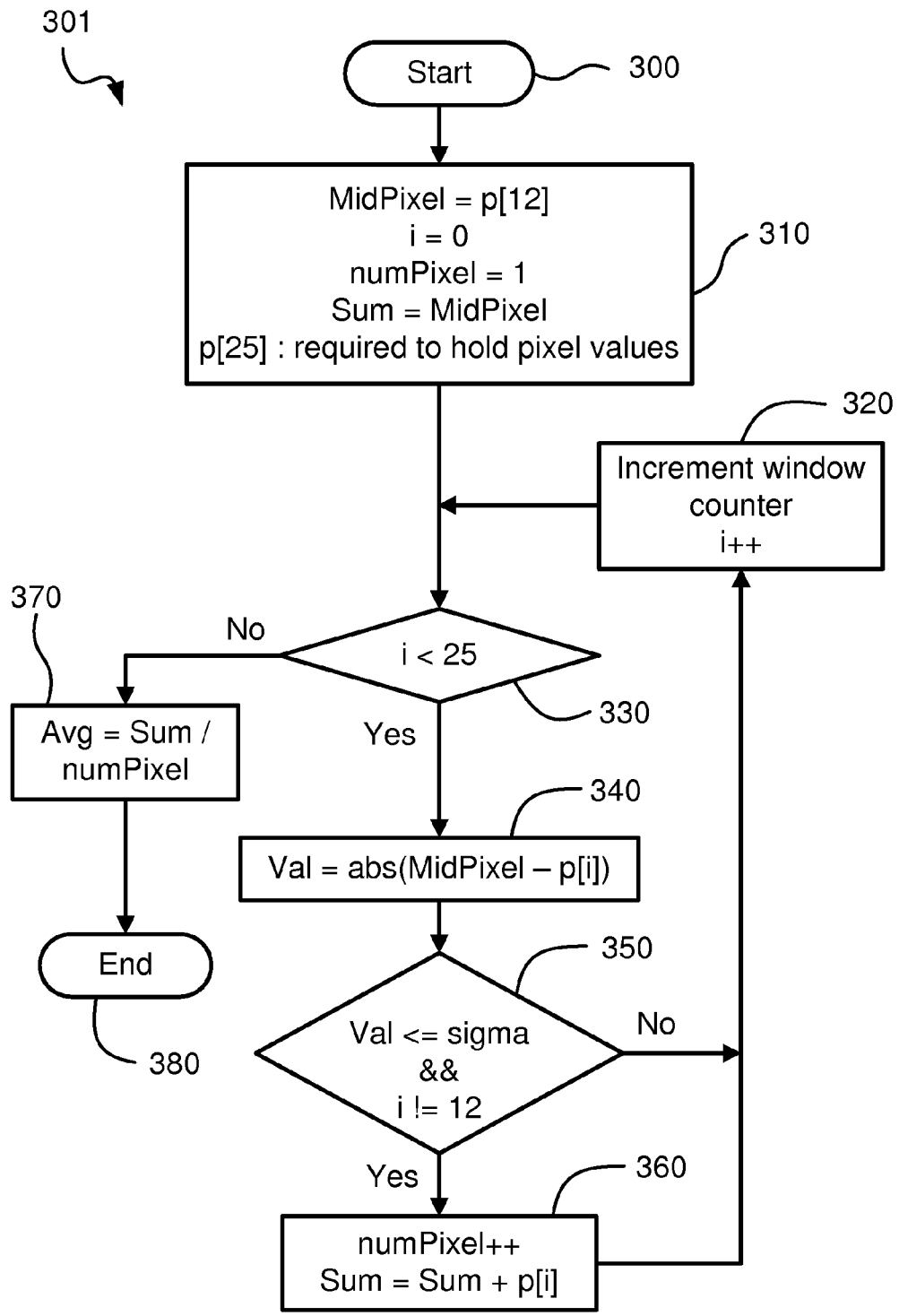
FIG. 7 is a flow chart showing how a sigma filter is used in the noise reduction step in the process of FIG. 10.

FIG. 7 is a flowchart depicting a process 301 (also referred to as a Sigma process) performed by a Sigma filter for a 5 by 5 window. The process 301 commences with a start step 300. A following step 310 is the initialization step for the Sigma process 301 which is used to initialize the variables that are used by the sigma filter. A following step 330 determines if the value of a variable "i" is less than "25". If this is the case, then the process 301 follows a "YES" arrow from the step 330 to a step 340. In the step 340, the value of each of the pixels in question, including the pixel upon which the 5 by 5 window is centered (this pixel also being referred to as the mid-pixel), is subtracted from the value of the mid-pixel, after which the absolute value of the result is taken.

A following decision step 350 determines if the value output by the step 340 is less than or equal to a parameter referred to as the "sigma value". In one arrangement, the sigma value is predefined based on heuristics. In an alternative arrangement, the sigma value is a tunable parameter that can be altered based upon the amount of noise reduction required and on the characteristics of the input stream 101 (see FIG. 1). The aforementioned characteristics of the input stream can be derived, for example, from analysis of the video content 101, or from metadata describing this content 101.

If the value determined by the step 350 is less than or equal to the sigma value, then the process 301 follows a YES arrow from the step 350 to a step 360, which maintains a count and sum of the pixels for which the step 350 yields a logical TRUE value. If this is not the case, then the process 301 follows a NO arrow from the step 350 to a step 320, which maintains a count of the pixels in the window, and is called a window counter. The step 320 increments the window counter, after which the process 301 is directed back to the step 330.

Returning to the step 360, once the step is complete, the process is directed from the step 360 to the step 320.

Returning to the step 330, this step compares the output of the window counter to the i by i window size, where i in the noted embodiment is 5. If i is greater or equal to 25 (5 by 5 window), then the process 301 follows a NO arrow from the step 330 to a subsequent step 370, which substitutes, for the value of the mid-pixel, the average value which is equal to the sum of the values of the pixels producing a logical TRUE output from the step 350, divided by the number of pixels producing a logical TRUE output from the step 350. Thereafter, the process 301 is directed to an END step 380.

Returning to the step 330, if i is less than 25, then the process 301 follows the YES arrow from the step 330 to the step 340 and the process 301 proceeds as described above until the end step 380 is reached.

A conventional Sigma filter may still result in edge blurring, especially if an edge has a transition nearby, or if the edge is part of a texture. Therefore, a weighted sigma filter is used, as depicted in FIG. 8, because this causes less blurring of transition edges and textures, while maintaining its noise reduction capabilities.

Figure 8:
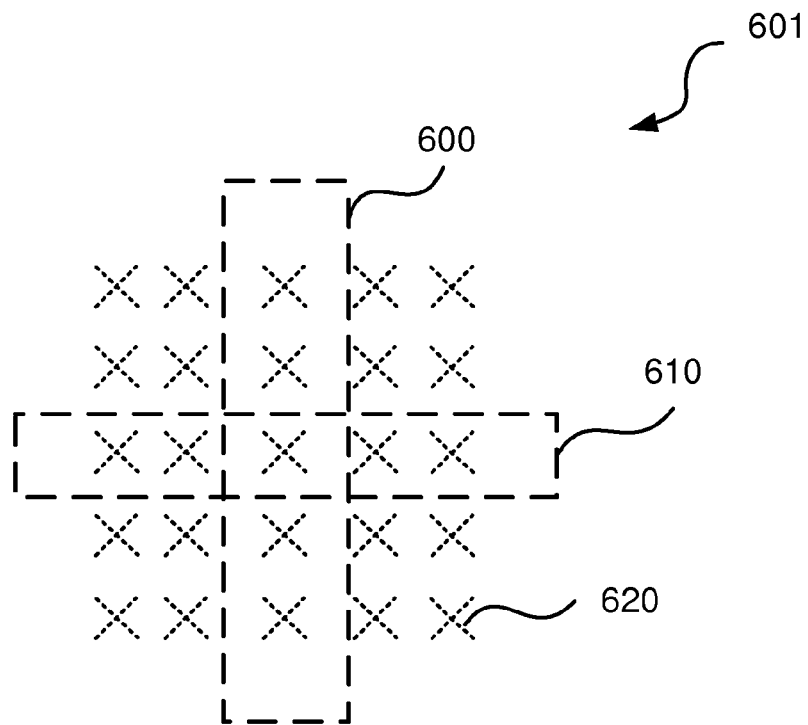
FIG. 8 Cross sigma filter.
Figure 8:
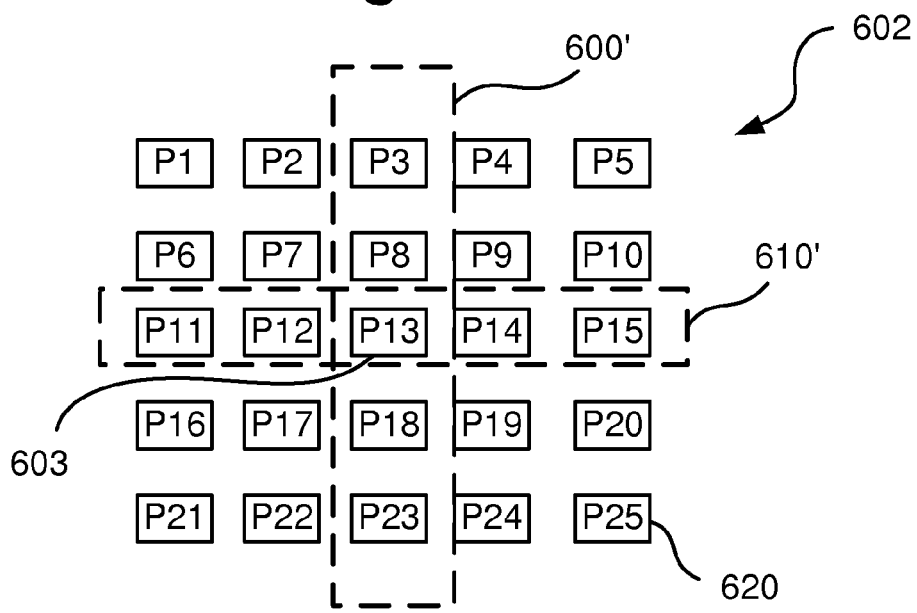

FIG. 8 depicts, in regard to the weighted Sigma filter, how only the pixels which are present in the middle column and middle row are considered. In the upper segment 601 of FIG. 8, pixels designated by reference numerals 600 and 610 are respectively the pixels in the middle row and middle column. The weights of the other pixels are set to 0. The numerals 600 and 610 thus represent all the non-zero pixels in the 5 by 5 window. Turning to the lower segment 602 of FIG. 8, the pixels in the column 600' and the row 610' are subtracted from the middle pixel (ie the mid-pixel) 603 and if the absolute value of this calculation is less than sigma, it causes the step 350 in FIG. 7 to produce a logical TRUE value. The rest of the processing is same as the one described for the general sigma filter. Apart from better noise reduction results, the weighted sigma filter allows for computational optimizations.

The thresholds and other parameters in the above description may be provided for a picture, a group of pictures or part of a picture by a system driving the noise reduction process based on other information about the pictures, such as compression ratio, or user settings, such as quality rating, or metadata, such as a genre description.

Figure 9:
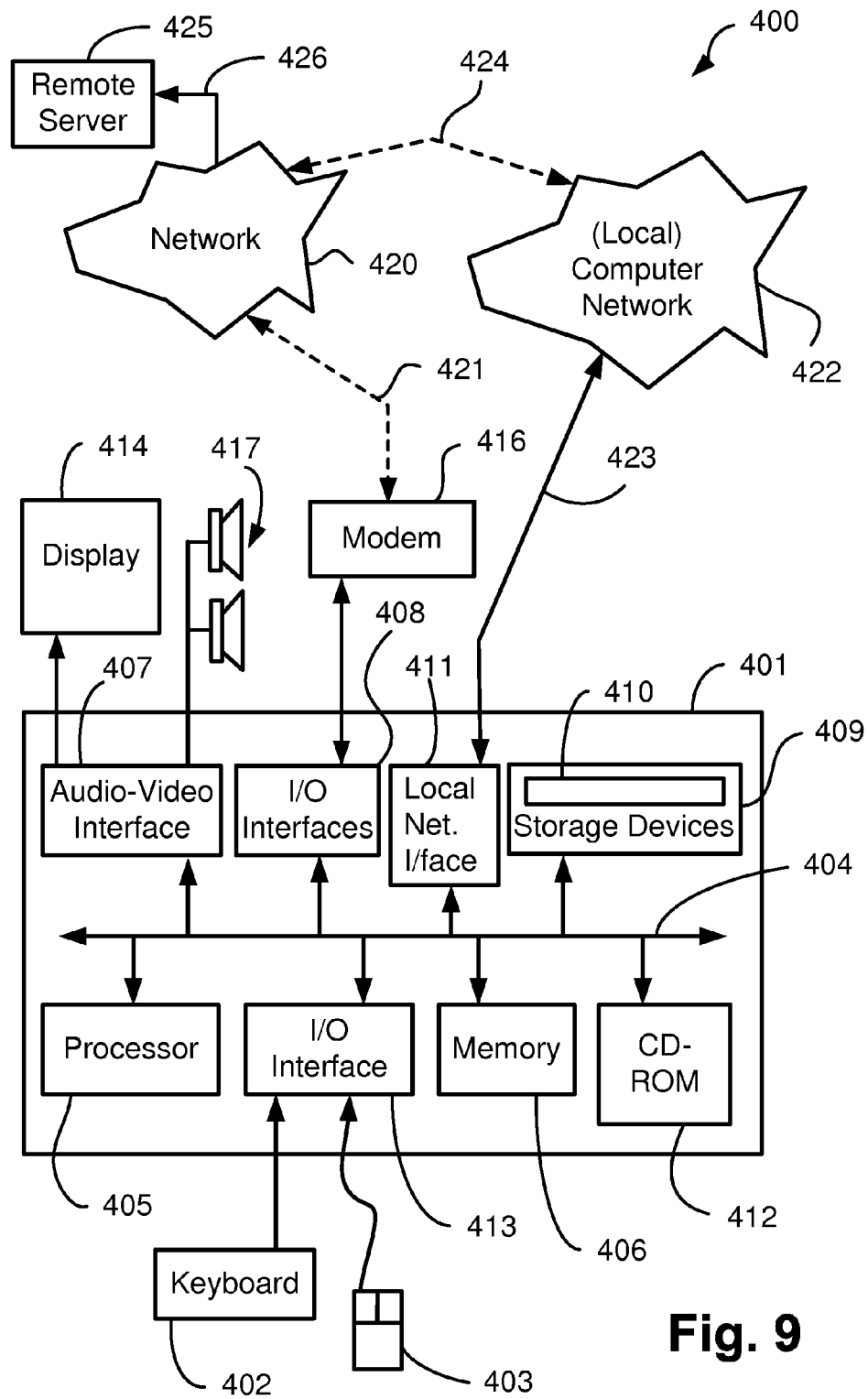
FIG. 9 is a schematic block diagram of a general purpose computer upon which the EENF arrangements can be practiced.

FIG. 9 is a schematic block diagram of a general purpose computer upon which the disclosed EENF arrangements described can be practiced using a computer system 400, wherein the processes of FIGS. 10 and 7 may be implemented as software, such as one or more EENF application programs executable within the computer system 400. In particular, the steps of the EENF method are effected by instructions in the software that are carried out within the computer system 400. The instructions may be formed as one or more code modules, each for performing one or more particular tasks. The software may also be divided into two separate parts, in which a first part and the corresponding code modules performs the EENF methods and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. A computer readable medium having such software or computer program recorded on it is a computer program product. The use of the computer program product in the computer system 400 preferably effects an advantageous apparatus for performing the EENF techniques.

As seen in FIG. 9, the computer system 400 is formed by a computer module 401, input devices such as a keyboard 402 and a mouse pointer device 403, and output devices including a printer 415, a display device 414 and loudspeakers 417. An external Modulator-Demodulator (Modem) transceiver device 416 may be used by the computer module 401 for communicating to and from a remote server 425 via a communications network 420 and connections 421 and 426. The network 420 may be a wide-area network (WAN), such as the Internet or a private WAN. Where the connection 421 is a telephone line, the modem 416 may be a traditional "dial-up" modem. Alternatively, where the connection 421 is a high capacity (eg: cable) connection, the modem 416 may be a broadband modem. A wireless modem may also be used for wireless connection to the network 420.

The computer module 401 typically includes at least one processor unit 405, and a memory unit 406 for example formed from semiconductor random access memory (RAM) and read only memory (ROM). The module 401 also includes an number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the external modem 416 and printer 415. In some implementations, the modem 416 may be incorporated within the computer module 401, for example within the interface 408. The computer module 401 also has a local network interface 411 which, via a connection 423, permits coupling of the computer system 400 to a local computer network 422, known as a Local Area Network (LAN). As also illustrated, the local network 422 may also couple to the wide network 420 via a connection 424, which would typically include a so-called "firewall" device or similar functionality. The interface 411 may be formed by an Ethernet™ circuit card, a wireless Bluetooth™ or an IEEE 802.11 wireless arrangement.

The interfaces 408 and 413 may afford both serial and parallel connectivity, the former typically being implemented according to the Universal Serial Bus (USB) standards and having corresponding USB connectors (not illustrated). Storage devices 409 are provided and typically include a hard disk drive (HDD) 410. Other devices such as a floppy disk drive and a magnetic tape drive (not illustrated) may also be used. An optical disk drive 412 is typically provided to act as a non-volatile source of data. Portable memory devices, such optical disks (eg: CD-ROM, DVD), USB-RAM, and floppy disks for example may then be used as appropriate sources of data to the system 400.

The components 405, to 413 of the computer module 401 typically communicate via an interconnected bus 404 and in a manner which results in a conventional mode of operation of the computer system 400 known to those in the relevant art.

Examples of computers on which the described arrangements can be practised include IBM-PC's and compatibles, Sun Sparcstations, Apple Mac™ or alike computer systems evolved therefrom.

Typically, the EENF application programs discussed above are resident on the hard disk drive 410 and read and controlled in execution by the processor 405. Intermediate storage of such programs and any data fetched from the networks 420 and 422 may be accomplished using the semiconductor memory 406, possibly in concert with the hard disk drive 410. In some instances, the EENF application programs may be supplied to the user encoded on one or more CD-ROM and read via the corresponding drive 412, or alternatively may be read by the user from the networks 420 or 422. Still further, the software can also be loaded into the computer system 400 from other computer readable media. Computer readable storage media refers to any non-transitory storage medium that participates in providing instructions and/or data to the computer system 400 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of transitory computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 414. Through manipulation of the keyboard 402 and the mouse 403, a user of the computer system 400 and the application may manipulate the interface to provide controlling commands and/or input to the applications associated with the GUI(s).

The EENF method may alternatively be implemented in dedicated hardware such as one or more integrated circuits performing the functions or sub functions of the EENF approach. Such dedicated hardware may include graphic processors, digital signal processors, or one or more microprocessors and associated memories.

The functional modules depicted in FIG. 1, namely the decoder 102, the edge mapper 100, the smooth region module 110, the edge region module 120, the near edge module 140, the AND module 160, and the noise reduction filter 180 can be implemented as software modules within the EENF application software, and/or as hardware modules communicating over the bus 404.

Industrial Applicability

It is apparent from the above that the arrangements described are applicable to the image processing industries.

The foregoing describes only some embodiments of the present invention, and modifications and/or changes can be made thereto without departing from the scope and spirit of the invention, the embodiments being illustrative and not restrictive. Accordingly, the invention can be incorporated in a television, video or other suitable apparatus.

The claims defining the invention are as follows:

1. A method of processing an image comprising a plurality of pixels, the method comprising the steps of:

providing an edge map for a group of pixels from the plurality of pixels;

classifying pixels in the group as one of at least smooth pixels and edge region pixels based upon the edge map, the edge region pixels being in an edge region with a predetermined concentration of edge pixels;

identifying near edge pixels, each of which is in a window that also contains an edge region pixel;

defining ringing noise pixels as pixels between the near edge pixels and the smooth pixels; and applying an edge preserving filter to the ringing noise pixels irrespective of whether the ringing noise pixels are edge pixels.

2. The method of claim 1, wherein the identifying step comprises applying, to a group of filters, a proximity filter having the following form:

10101
00000
10001
00000
10101.

3. The method of claim 1, comprising a further step of applying a noise reduction filter to pixels classified as ringing noise pixels.

4. The method of claim 1, comprising a further step of applying an edge preserving filter to the identified pixels.

5. The method of claim 4, wherein the step of applying the edge preserving filter is performed irrespective of whether the identified pixels relate to an edge.

6. The method of claim 1, wherein the providing, classifying, identifying and defining steps are successively applied to groups of pixels across the image to thereby process the image.

7. The method of claim 1, wherein the providing step is firstly applied across the image, and subsequently, the classifying, identifying and defining steps are successively applied, dependent upon the edge maps from the providing step, to groups of pixels across the image to thereby process the image.

8. The method of claim 1, wherein the providing and classifying steps are firstly applied across the image, and subsequently, the identifying and defining steps are successively applied, dependent upon the results of the providing step and the classifying step, to groups of pixels across the image to thereby process the image.

9. The method of claim 1, wherein the identifying step further requires that the identified pixel be in the proximity of a smooth pixel.

10. A method according to claim 1, wherein the smooth pixels are classified as one of ringing smooth pixels and block smooth pixels, the ringing smooth pixels being a subset of the block smooth pixels and the ringing noise pixel being located within a predetermined distance of a ringing smooth pixel.

11. A method according to claim 10, wherein said edge preserving filter is also applied to pixels classified as block smooth pixels.

12. An apparatus for processing an image comprising a plurality of pixels, the apparatus comprising:
a memory configured to store a program; and
a processor configured to execute the program, the program comprising:
code for providing an edge map for a group of pixels from the plurality of pixels;
code for classifying pixels in the group as one of at least smooth pixels and edge region pixels based upon the edge map, the edge region pixels being pixels in an edge region with a predetermined concentration of edge pixels;
code for identifying near edge pixels, each of which is in a window that also contains an edge region pixel;
code for defining ringing noise pixels as pixels between the near edge pixels and the smooth pixels; and
code for applying an edge preserving filter to the ringing noise pixels irrespective of whether the ringing noise pixels are pixel edge pixels.

13. A video apparatus for processing an image comprising a plurality of pixels, the apparatus comprising:
a memory configured to store a program; and
a processor configured to execute the program, the program comprising:
code for providing an edge map for a group of pixels from the plurality of pixels;
code for classifying pixels in the group as one of at least smooth pixels and edge region pixels based upon the edge map, the edge region pixels being pixels in an edge region with a predetermined concentration of edge pixels;
code for identifying near edge pixels, each of which is in a window that also contains an edge region pixel;
code for defining ringing noise pixels as pixels between the near edge pixels and the smooth pixels; and
code for applying an edge preserving filter to the ringing noise pixels irrespective of whether the ringing noise pixels are edge pixels.

14. A non-transitory computer readable storage medium having recorded thereon a computer program for directing a processor to execute a method for processing an image comprising a plurality of pixels, said program comprising:
code for providing an edge map for a group of pixels from the plurality of pixels;
code for classifying pixels in the group as one of at least smooth pixels and edge region pixels based on the edge map, the edge region pixels being pixels in an edge region with a predetermined concentration of edge pixels;
code for identifying near edge pixels, each of which is in a window that also contains an edge region pixel;
code for defining ringing noise pixels as pixels between the near edge pixels and the smooth pixels; and
code for applying an edge preserving filter to the ringing noise pixels irrespective of whether the ringing noise pixels are edge pixels.

* * * * *